United States Patent [19]

Byrne

[11] 4,421,005
[45] Dec. 20, 1983

[54] EXPLOSIVE ACTUATED VALVE

[75] Inventor: Kenneth G. Byrne, Livermore, Calif.

[73] Assignee: The United States of America as represented by the United States Department of Energy, Washington, D.C.

[21] Appl. No.: 183,706

[22] Filed: Mar. 28, 1962

[51] Int. Cl.³ .............................................. F16K 17/00
[52] U.S. Cl. .................................... 89/1 B; 137/68 R; 137/68 A
[58] Field of Search ..................... 188/1; 60/26.1, 35.6; 89/1, 1.01, 1.5 F; 137/67, 68, 65, 66, 624.25; 220/47

[56] References Cited

U.S. PATENT DOCUMENTS

| | | | |
|---|---|---|---|
| 2,375,498 | 5/1945 | Seymour | 137/67 |
| 2,557,448 | 6/1951 | Mathisen | 89/1 B X |
| 2,997,051 | 8/1961 | Williams | 137/68 R |
| 3,027,903 | 4/1962 | Thorp | 137/68 R |

OTHER PUBLICATIONS

"Explosive Actuated Valves" by Maurice Connell, Conax Corp., Buffalo, N.Y., pp. 3-7, 9-24-56.

Primary Examiner—David H. Brown
Attorney, Agent, or Firm—Dudley W. King; Richard G. Besha

EXEMPLARY CLAIM

1. A device of the character described comprising the combination of a housing having an elongate bore and including a shoulder extending inwardly into said bore, a single elongate movable plunger disposed in said bore including an outwardly extending flange adjacent one end thereof overlying said shoulder, normally open conduit means having an inlet and an outlet perpendicularly piercing said housing intermediate said shoulder and said flange and including an intermediate portion intersecting and normally openly communicating with said bore at said shoulder, normally closed conduit means piercing said housing and intersecting said bore at a location spaced from said normally open conduit means, said elongate plunger including a shearing edge adjacent the other end thereof normally disposed intermediate both of said conduit means and overlying a portion of said normally closed conduit means, a deformable member carried by said plunger intermediate said flange and said shoulder and normally spaced from and overlying the intermediate portion of said normally open conduit means, and means on the housing communicating with the bore to retain an explosive actuator for moving said plunger to force the deformable member against the shoulder and extrude a portion of the deformable member out of said bore into portions of the normally open conduit means for plugging the same and to effect the opening of said normally closed conduit means by the plunger shearing edge substantially concomitantly with the plugging of the normally open conduit means.

4 Claims, 6 Drawing Figures

EXPLOSIVE ACTUATED VALVE

The present invention relates generally to explosive actuated valves and more particularly to such which include movable means adapted to open one conduit while substantially simultaneously closing another conduit.

In some instances it is desirable to use an explosive actuated valve that is capable of controlling valve parts or passageways for an object and a fluid or a plurality of fluids by a single valve actuation. Such a valve may be used in, for example, a rocket vehicle combustion system where it is often desirable to feed the propellants to the combustion zone first at relatively low pressure to initiate combustion and then at a higher pressure to maintain continuous combustion.

An object of the present invention is to provide a remotely controlled device wherein, prior to actuation of the device, a fluid or object may move relatively unrestrictedly through a normally open through-going or piercing conduit in the device and upon actuation of the device a movable plunger means opens a normally closed through-going conduit for passage of another fluid through the device which immediately thereafter or substantially simultaneously therewith breaks the continuity through the first mentioned conduit.

Another object of the present invention is to provide a new and improved explosive actuated device in which a movable plunger provided with cold flowing deformable means closes a normally open conduit and secures the plunger against further movement.

A still further object of the present invention is to provide a new and novel explosive actuated valve of simple construction which may be economically manufactured.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description. The preferred embodiment illustrated is not intended to be exhaustive nor to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 1:
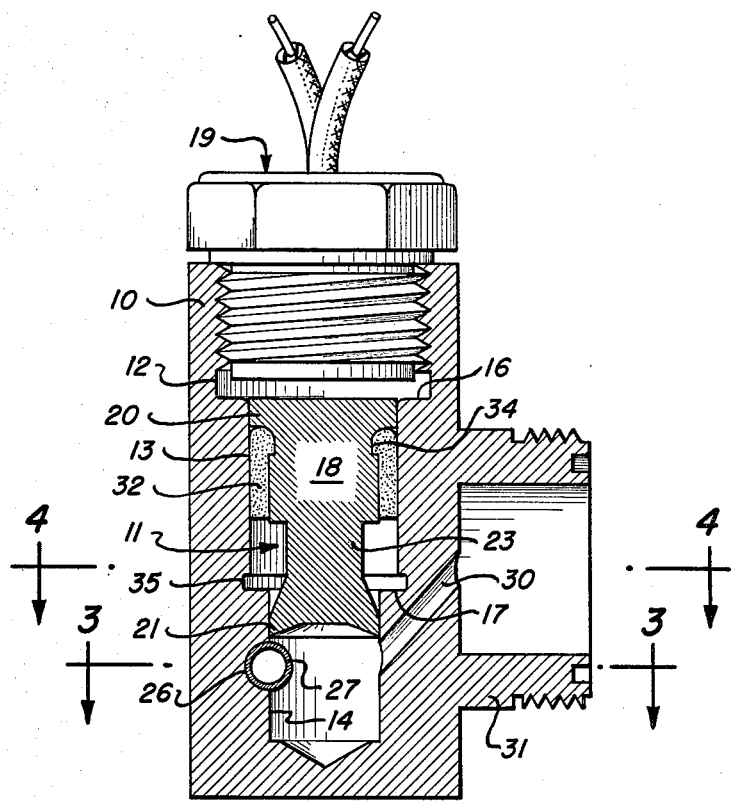
FIGS. 1 and 2 are sectional views of the present device showing the plunger in, respectively, pre-actuated and actuated positions.

Described generally the present invention as illustrated in FIGS. 1-6 comprises an explosive actuated valve having a housing including a bore with an explosively driven plunger or piston therein provided with a sleeve of cold flowing deformable material and disposed "above" a pair of conduits, one of which is normally closed and the other normally open, that communicate with the bore in such a manner that movement of the plunger by actuation of an explosive charge or squib effects opening of the normally closed conduit by shearing away a portion of the conduit while substantially simultaneously therewith closing or plugging the other conduit by cold-flowing and locking the deformable material into the open conduit.

With further reference to FIGS. 1-6, the present invention comprises an explosive actuated valve having a housing 10 with a bore 11 therein which openly communicates with one end of the housing and terminates adjacent the other end thereof. The bore 11, which may be provided with three counter-bored or stepped sections 12, 13 and 14 of respectively decreasing diameters and delimited by shoulders 16 and 17, is adapted to receive a plunger or piston 18 and a portion of an explosive charge or squib 19.

The plunger 18, which normally comprises an elongate member having one end provided with an annular flange 20 and the other end with concave annular cutting lip or shearing edge 21, may be initially positioned within the bore 11 so that the flange 20 is adjacent the outermost shoulder 16 and within the intermediate stepped section 13 while the annular shearing edge 21 extends into the innermost stepped section 14. Adjacent the shearing edge 21 of the plunger there may be provided an annular recessed portion 23 which permits relatively unrestricted fluid flow about the plunger body as will be described in detail below.

The explosive squib or charge 19, which may be of any suitable electrically actuated and commercially available type, may have the explosive containing portion thereof positioned within the outermost stepped section 12 of the bore 11 and be rigidly secured to the housing in a fluid-tight manner by mating threads or the like and be in such positional relationship with the flanged end of the plunger that actuation of the squib 19 will instantly impose a repelling force upon the plunger causing the latter to move away from the squib (downwardly as shown) and effect the opening and closing of the particular conduits as will be brought out below.

Figure 4:
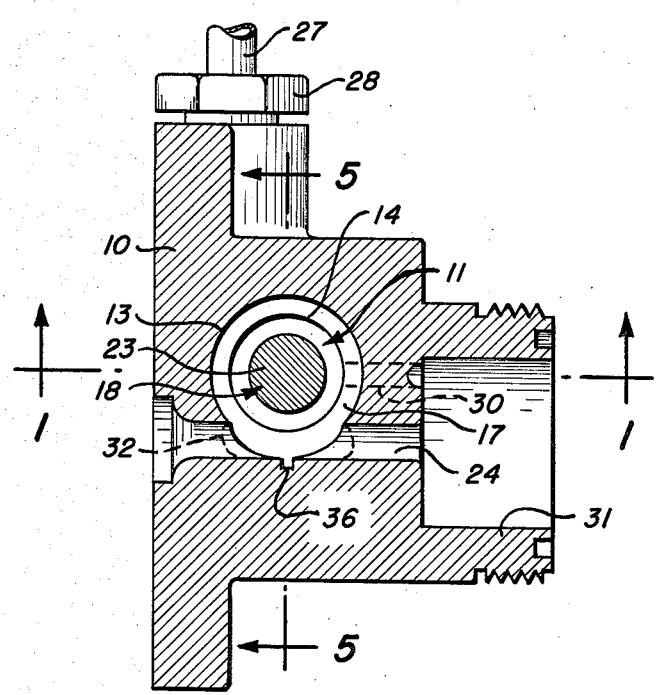
FIG. 4 is a plan view taken along line 4—4 of FIG. 1 showing the tangential relationship of the normally open conduit with the plunger bore and also showing the deformable material cold-flowed into the conduit and interlocked therewith.
Figure 5:
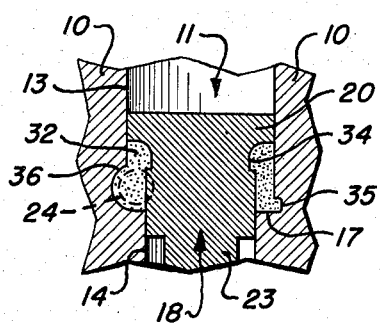
FIG. 5 is a fragmentary sectional view taken generally along line 5—5 of FIG. 4 also showing generally the final configuration of the deformable material after being cold-flowed by the plunger and interlocked with conduit walls.

To provide for movement of fluid or object through the valve a broken through-going aperture or conduit 24 may be positioned in the housing 10 so that the conduit openly communicates with intermediate stepped section 13 of the bore adjacent the innermost bore shoulder 17. As shown in FIG. 4 the conduit 24 tangentially intersects the bore 11, this relationship providing for relatively unrestricted movement of an object or fluid through the valve.

Figure 6:
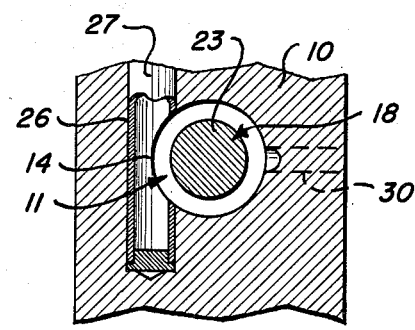
FIG. 6 is a plan view generally similar to FIG. 3 but showing a portion of the conduit sheared away.

An additional fluid conveying aperture or conduit 26 extends into the valve housing 10 and terminates adjacent the innermost stepped section 14 of the bore 11. This conduit normally tangentially intersects the stepped section 14 of the bore 11 and may contain a tubular insert 27 of any suitable shearable material that lies in the path of the plunger shearing edge 21 (FIG. 3), thus permitting the shearing edge of the plunger to "cut" away a portion of the insert and establish fluid communication between the interior of the insert and the bore 11 (FIG. 6). The tubular insert may be held and sealed in the conduit 26 in any suitable manner, such as, for example, by a binding and locking sleeve 28 which may be threadably received in the housing. A passageway 30 may be provided in the housing 10 to establish a duct between sheared tubular insert 27 and a location outside the valve. This passageway 30 may communicate with the bore 11 at substantially the same level as the conduit 26 and thus, when the plunger is actuated, the plunger recess 23 is adjacent both the conduit 26 and the opening to the passageway 30 to facilitate fluid flow through the valve.

Figure 2:
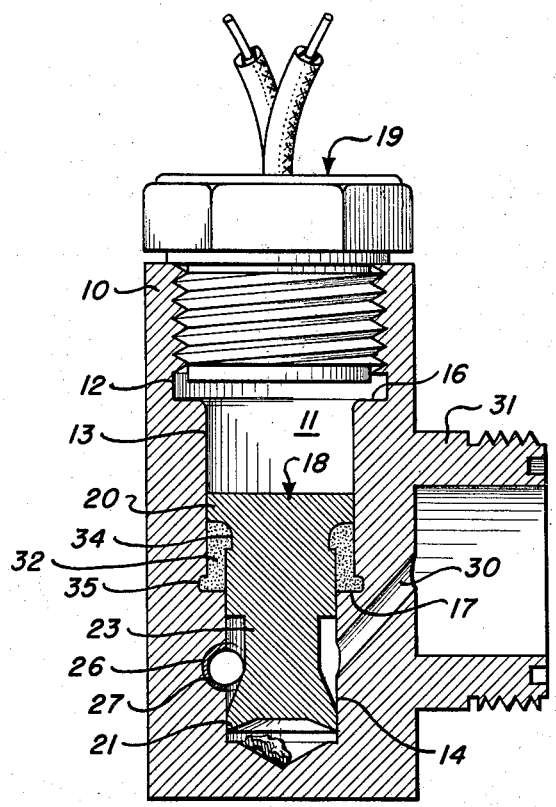
Figure 3:
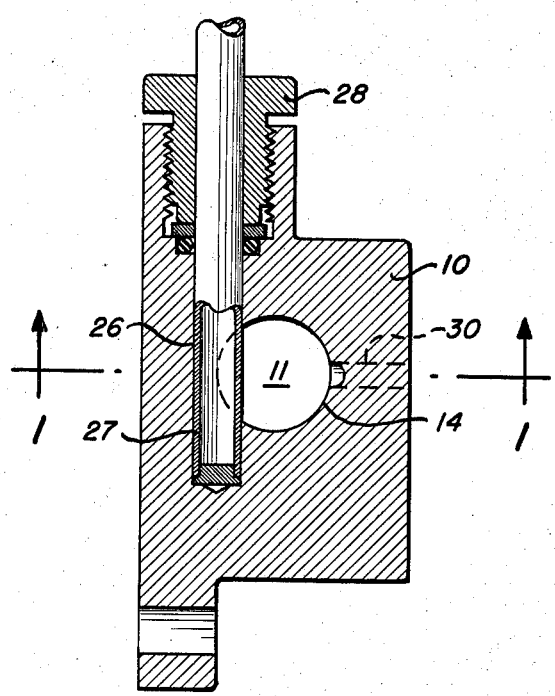
FIG. 3 is a plan view taken generally along line 3—3 of FIG. 1 showing the position of the normally closed shearable conduit in the plunger bore.

As shown the valve housing is provided with a threaded extension 31 which may be used to secure the valve to a suitable fluid or object conveying or containing means or to a point of use for the fluids or objects. This extension may have a sufficiently large internal diameter to permit both the conduit 24 and the passageway 30 to terminate in a common duct or outlet. To enable the passageway 30 to terminate within the extension 31 it may be drilled or otherwise provided in the housing at a suitable angle such as shown in FIGS. 1 and 2. While the conduits 24 and 26 are shown disposed at substantially right angles to each other and while a common duct is provided for both conduits 24 and 26 it will be clear to another skilled in the art to position such conduits in any desirable location within the housing and to provide each conduit with its own duct work.

It has been found that by providing a portion of the plunger with a ring of cold flowing deformable or extrudable material a highly efficient and positive closure of the conduit 24 may be attained when the substantial stress applied upon the plunger by the exploding squib deforms the material and causes it to cold-flow into the conduit openings so as to fill and interlock therein. This feature of cold flowing material into a conduit opening is very desirable because of its positive sealing property which tends to greatly simplify the construction of this multi-purpose valve. Also such cold flowing of material may be used to secure the plunger 18 in a desired location within the bore after the plunger has been moved to such location by the exploding squib 19.

The deformable material 32 may be placed about the plunger body in the form of a ring or in any other desired shape immediately adjacent the inner surface of the plunger flange 20 and may extend inwardly or downwardly to a point adjacent the uppermost part of the plunger recess 23. Of course, the amount of the cold flowing material used is dependent upon the size of the conduit openings to be sealed and the empty volume to be filled about the plunger body in the area adjacent the housing shoulder 17. The deformable material 32, which may be of any suitable material or metal, such as, for example, aluminum or aluminum alloy, may be united to the plunger body by providing the latter with an annular recess 34 adjacent the flange 20 which serves to receive a portion of the deformable material for securing the material to the plunger body. Normally the deformable material "presses" against the wall of the stepped section 13 so as to help maintain the plunger in a desired initial position within the bore 11 and to provide a fluid seal.

The plunger 18, except for the flange 20 and the two recessed portions 23 and 34, may be of a diameter slightly less than the diamter of the stepped portion 14 so that when the plunger 18 is stressed by the exploding squib 19 the portion of the plunger adjacent the deformable material barely clears the inner edge of the bore shoulder 17 which causes the deformable material to abut against the shoulder 17 and cold-flow outwardly away from the plunger 18 to close the conduit openings (as indicated by the dotted lines in conduit 24 in FIG. 4) and completely fill the space between the plunger flange 20 and the housing shoulder 17.

To aid in securing the plunger 18 in actuated position the housing may be provided with an undercut 35 so that the deformable material will be forced into the undercut and "lock" the plunger in place (FIG. 5) and to insure that the deformed material provides a secure and leak-tight seal between the spaced apart openings of conduit 24, especially adjacent the housing 10, there may be provided a small notch 36 in the housing 10 between such conduit openings which is adapted to receive and interlock with a portion of the cold flowing material. The notch 36 may be cresent shaped (FIG. 5) to insure filling with the deformable material.

In the operation of the present device the conduit 24 may normally provide an open duct and at a predetermined time an appropriate signal to the explosive squib 19 actuates the latter which generates substantial pressure within the stepped section 12 immediately above the plunger 18 and causes the plunger 18 to be rapidly repelled away from the squib 19. As the plunger rapidly moves away from the squib the plunger cutting edge engages the portion of the tubular insert 27 extending into the bore 11 and "cuts" away such portion to establish an open duct through the conduit 26 and passageway 30. Immediately after or substantially simultaneously with the opening of conduit 26 the inner end of the deformable material abuts the shoulder 17 and stops while the plunger continues its downward travel. This stopping of the deformable material and the continued movement of the plunger causes the deformable material to cold-flow outwardly away from the plunger and into the openings of conduit 24 which communicate with the bore 11 so as to break the continuity through the latter. The cold flowing deformable material is also forced into the undercut 35 to "lock" the plunger in place as it ends its downward travel. The shearing edge 21 of the plunger 18 may be initially positioned adjacent the tubular insert 27 so that the portion of the insert 27 extending into the bore is "cut" away before the deformable ring abuts the housing shoulder 17 so as to provide the plunger with maximum shearing energy before such energy is rapidly absorbed in cold flowing the deformable material.

It will be seen that the present device provides a relatively simple valve capable of controlling the opening and closing of a pair of conduits in a very rapid and positive manner.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device of the character described comprising the combination of a housing having an elongate bore and including a shoulder extending inwardly into said bore, a single elongate movable plunger disposed in said bore including an outwardly extending flange adjacent one end thereof overlying said shoulder, normally open conduit means having an inlet and an outlet perpendicularly piercing said housing intermediate said shoulder and said flange and including an intermediate portion intersecting and normally openly communicating with said bore at said shoulder, normally closed conduit means piercing said housing and intersecting said bore at a location spaced from said normally open conduit means, said elongate plunger including a shearing edge adjacent the other end thereof normally disposed intermediate both of said conduit means and overlying a portion of said normally closed conduit means, a deformable member carried by said plunger intermediate said flange and said shoulder and normally spaced from and overlying the intermediate portion of said normally open conduit means, and means on the housing communicating with the bore to retain an explosive actuator for moving said plunger to force the deformable member against the shoulder and extrude a portion of the deformable member out of said bore into portions of the normally open conduit means for plugging the same and to effect the opening of said normally closed conduit means by the plunger shearing edge substantially concomitantly with the plugging of the normally open conduit means.

2. The device claimed in claim 1 wherein the normally open piercing conduit means is disposed generally tangential to the bore, the intermediate portion of the normally open conduit means has a pair of open ends each terminating adjacent the bore at spaced apart locations on one surface of said shoulder, and wherein the deformable member is extruded into both said open ends of the normally open conduit means.

3. The device claimed in claim 2 wherein notch means is disposed in the housing intermediate the open ends of the normally open piercing conduit means for receiving a portion of the deformable member.

4. A device of the character described comprising in combination a housing having an elongate bore and including a shoulder extending into the bore intermediate opposite ends thereof defining a pair of bore compartments, normally open conduit means having an inlet and outlet piercing said housing and substantially perpendicularly intersecting one of said bore compartments at a location contiguous with said shoulder and including an intermediate portion in normally open communication with said bore, a single movable plunger within said bore continuously extending into both of said bore compartments including a flange disposed in said one bore compartment overlying said shoulder and said normally open portion of said conduit means, a deformable member carried by said plunger adjacent said flange and normally spaced from the normally open portion of the conduit means providing a seal between said plunger and said housing, means operatively associated with the housing to retain an explosive actuator for selectively exerting a moving force against said plunger to urge the deformable member against said shoulder and thereby effecting extrusion of a portion of said member into portions of said conduit means to plug the same.

* * * * *